US011855535B1

(12) United States Patent
Nguyen et al.

(10) Patent No.: US 11,855,535 B1
(45) Date of Patent: Dec. 26, 2023

(54) HIGH VOLTAGE STAGE FOR SWITCHING REGULATOR

(71) Applicant: Empower Semiconductor, Inc., Milpitas, CA (US)

(72) Inventors: Bai Nguyen, Fremont, CA (US); Haritha Chanda, Milpitas, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 119 days.

(21) Appl. No.: 17/460,019

(22) Filed: Aug. 27, 2021

Related U.S. Application Data

(60) Provisional application No. 63/071,147, filed on Aug. 27, 2020.

(51) Int. Cl.
*H02M 3/158* (2006.01)
(52) U.S. Cl.
CPC ................... *H02M 3/158* (2013.01)
(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 2003/1566; H02M 2003/1557; H02M 2001/0012; H02M 2001/0009; H02M 2001/385; H04B 2215/069
See application file for complete search history.

(56) References Cited

U.S. PATENT DOCUMENTS 9,985,526 B1 * 5/2018 Oak .................. H02M 3/33507

OTHER PUBLICATIONS

V. Kursun, S. G. Narendra, V. K. De and E. G. Friedman, "High input voltage step-down DC-DC converters for integration in a low voltage CMOS process," *International Symposium on Signals, Circuits and Systems. Proceedings, SCS 2003*. (Cat. No. 03EX720), San Jose, CA, USA, 2004, pp. 517-521.
C. Schaef et al., "8.1 A 93.8% Peak Efficiency, 5V-Input, 10A Max ILOAD Flying Capacitor Multilevel Converter in 22nm CMOS Featuring Wide Output Voltage Range and Flying Capacitor Precharging," *2019 IEEE International Solid-State Circuits Conference—(ISSCC)*, San Francisco, CA, USA, 2019.
Peter Renz, Maik Kaufmann, Michael Lueders and Bernhard Wicht, Switch Stacking in Power Management ICs, IEEE Journal of Emerging and Selected Topicsin Power Electronics, vol. 9, No. 3, Jun. 2021, pp. 3735-3743.

* cited by examiner

*Primary Examiner* — Bryan R Perez
(74) *Attorney, Agent, or Firm* — Kilpatrick Townsend & Stockton LLP

(57) ABSTRACT

A power converter is disclosed. The power converter includes a positive power supply, an output node, first, second, and third high side transistors serially connected between the positive power supply and the output node, and a high side bias voltage generator configured to generate a high side bias voltage. A gate of the second high side transistor is connected to the high side bias voltage generator. The power converter also includes a signal driver configured to selectively connect a gate of the first transistor to either the positive power supply or the high side bias voltage generator, a switch configured to selectively connect a gate of the third transistor to the high side bias voltage generator, and a capacitor connected to the gate of the third transistor and to a source of the second high side transistor.

20 Claims, 7 Drawing Sheets

Case 1

# HIGH VOLTAGE STAGE FOR SWITCHING REGULATOR

CROSS-REFERENCE TO RELATED APPLICATION

This application claims the benefit of U.S. Provisional Patent Application No. 63/071,147, titled "HIGH VOLTAGE STAGE FOR SWITCHING REGULATOR," filed Aug. 27, 2020, which is hereby incorporated in its entirety and for all purposes.

FIELD OF THE INVENTION

The present application generally relates to semiconductor switching power converters, and more particularly to an output stage of switching voltage regulators.

BACKGROUND OF THE INVENTION

This application refers generally to switching voltage regulators. These regulators include, but are not limited to, isolated and non-isolated varieties such as buck, buck-boost, boost, flyback, etc. Output stages of switching voltage regulators may include a number of transistors serially connected between positive and negative power supplies. The transistors cause the switching voltage regulators to deliver power to a load. Improvements in controlling the transistors are needed in the art.

BRIEF SUMMARY OF THE INVENTION

One inventive aspect is a power converter including a positive power supply terminal, a negative power supply terminal, an output node, and first, second, and third high side transistors serially connected between the positive power supply terminal and the output node. The power converter also includes a high side bias voltage generator configured to generate a high side bias voltage, where a gate of the second high side transistor is connected to the high side bias voltage generator, a controller configured to selectively connect a gate of the first high side transistor to either the positive power supply terminal or the high side bias voltage generator, and a high side switch configured to selectively connect a gate of the third high side transistor to the high side bias voltage generator in response to a high side signal from the controller. The high side signal switches between low and high voltage states, and a difference between the low and high voltage states is equal to about $1/3$ of a voltage difference between a voltage of the positive power supply terminal and a voltage of the negative power supply terminal.

In some embodiments, the high side bias voltage generator is configured to generate a voltage about equal to $2/3$ of the voltage difference between the voltage of the positive power supply terminal and the voltage of the negative power supply terminal.

In some embodiments, the first, second, and third high side transistors are configured to become conductive in response to the controller connecting the gate of the first high side transistor to the high side bias voltage generator.

In some embodiments, the controller is configured to cause the high side switch to connect the gate of the third high side transistor to the high side bias voltage generator while the gate of the first high side transistor is connected to the high side bias voltage generator.

In some embodiments, the controller is configured to cause the high side switch to disconnect the gate of the third high side transistor from the high side bias voltage generator while the gate of the first high side transistor is connected to the positive power supply terminal.

In some embodiments, the power converter also includes first, second, and third low side transistors serially connected between the negative power supply terminal and the output node, and a low side bias voltage generator configured to generate a low side bias voltage. A gate of the second low side transistor is connected to the low side bias voltage generator, and the controller is configured to selectively connect a gate of the first low side transistor to either the negative power supply terminal or the low side bias voltage generator. The power converter also includes a low side switch configured to selectively connect a gate of the third low side transistor to the low side bias voltage generator in response to a low side signal from the controller, where the low side signal switches between the low and high voltage states, and a low side capacitor connected to the gate of the third low side transistor and to a source of the second low side transistor.

In some embodiments, the low side bias voltage generator is configured to generate a voltage about equal to about $1/3$ of the voltage difference between the voltage of the positive power supply terminal and the voltage of the negative power supply terminal.

In some embodiments, the first, second, and third low side transistors are configured to become conductive in response to the controller connecting the gate of the first low side transistor to the low side bias voltage generator.

In some embodiments, the controller is configured to cause the low side switch to connect the gate of the third low side transistor to the low side bias voltage generator while the gate of the first low side transistor is connected to the low side bias voltage generator.

In some embodiments, the controller is configured to cause the low side switch to disconnect the gate of the third low side transistor from the low side bias voltage generator while the gate of the first low side transistor is connected to the negative power supply terminal.

Another inventive aspect is a method of operating a power converter including a positive power supply, a negative power supply, an output node, first, second, and third high side transistors serially connected between the positive power supply and the output node, a high side bias voltage generator, a controller, and a high side switch. The method also includes, with the high side bias voltage generator, providing a high side bias voltage to a gate of the second high side transistor, with the controller, selectively connecting a gate of the first high side transistor to either the positive power supply or the high side bias voltage generator, and with the high side switch, selectively connecting a gate of the third high side transistor to the high side bias voltage generator in response to a high side signal from the controller. The high side signal switches between low and high voltage states, and a difference between the low and high voltage states is equal to about $1/3$ of a voltage difference between a voltage of the positive power supply and a voltage of the negative power supply.

In some embodiments, the high side bias voltage generator is configured to generate a voltage about equal to $2/3$ of the voltage difference between the voltage of the positive power supply and the voltage of the negative power supply.

In some embodiments, the first, second, and third high side transistors are configured to become conductive in response to the controller connecting the gate of the first high side transistor to the high side bias voltage generator.

In some embodiments, the method also includes, with the controller, causing the high side switch to connect the gate of the third high side transistor to the high side bias voltage generator while the gate of the first high side transistor is connected to the high side bias voltage generator.

In some embodiments, the method also includes, with the controller, causing the high side switch to disconnect the gate of the third high side transistor from the high side bias voltage generator while the gate of the first high side transistor is connected to the positive power supply.

In some embodiments, the power converter further includes first, second, and third low side transistors serially connected between the negative power supply and the output node, a low side bias voltage generator, a low side switch, and a low side capacitor, and the method further includes, with the low side bias voltage generator, providing a low side bias voltage to a gate of the second low side transistor, with the controller, selectively connecting a gate of the first low side transistor to either the negative power supply or the low side bias voltage generator, and with the low side switch, selectively connecting a gate of the third high side transistor to the low side bias voltage generator in response to a low side signal from the controller, where the low side signal switches between the low and high voltage states.

In some embodiments, the low side bias voltage generator is configured to generate a voltage about equal to about ⅓ of the voltage difference between the voltage of the positive power supply and the voltage of the negative power supply.

In some embodiments, the first, second, and third low side transistors are configured to become conductive in response to the controller connecting the gate of the first low side transistor to the low side bias voltage generator.

In some embodiments, the method also includes, with the controller, causing the low side switch to connect the gate of the third low side transistor to the low side bias voltage generator while the gate of the first low side transistor is connected to the low side bias voltage generator.

In some embodiments, the method also includes, with the controller, causing the low side switch to disconnect the gate of the third low side transistor from the low side bias voltage generator while the gate of the first low side transistor is connected to the negative power supply.

DETAILED DESCRIPTION OF THE INVENTION

Figure 1:
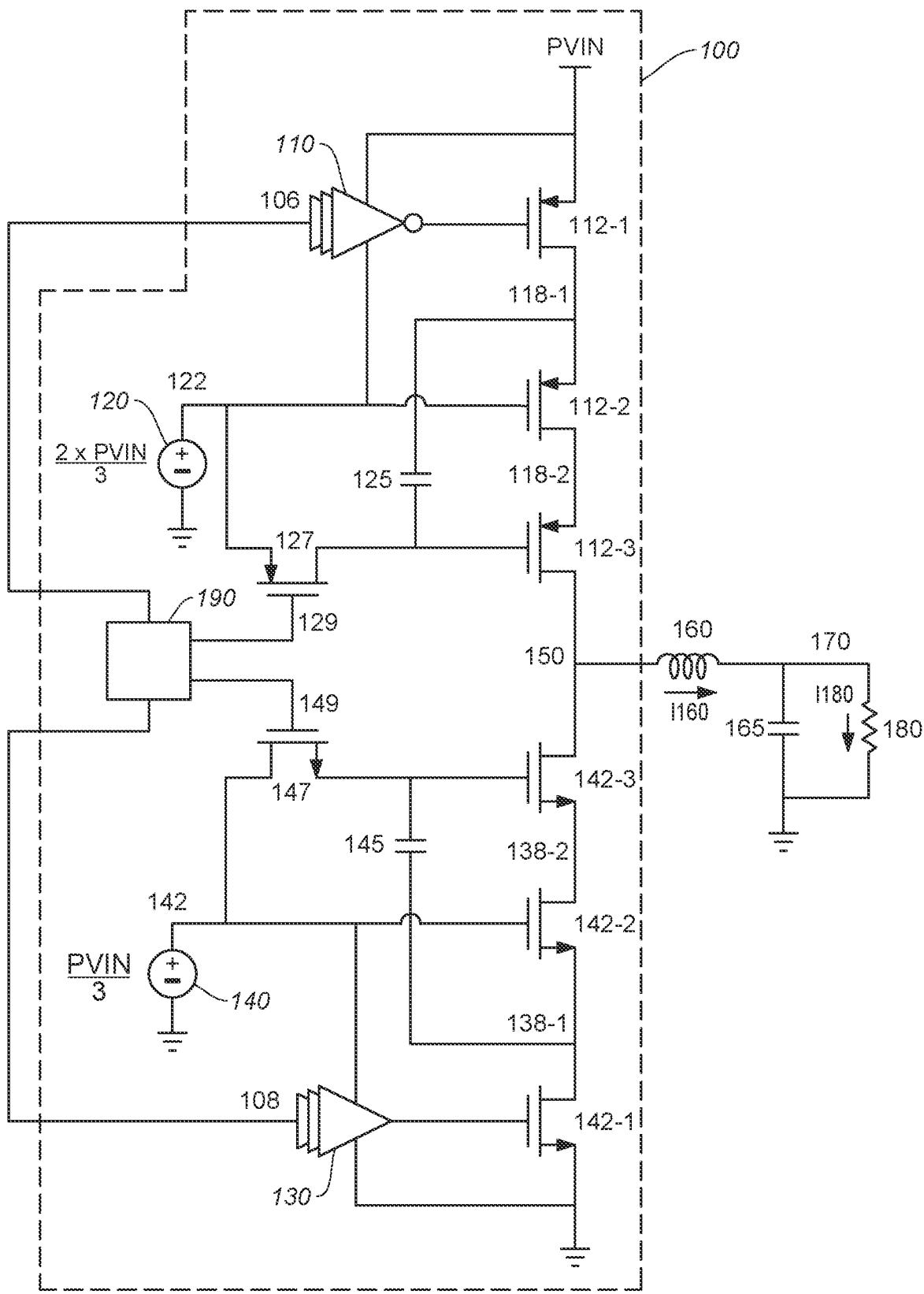
FIG. 1 is a schematic illustration of a stage of a switching voltage regulator according to an embodiment.

Power demand for emerging applications, such as data center and mobile devices continues to increase. Consequently, the demands on the DC-DC voltage regulators cause them to occupy a relatively large portion of space and a primary factor in power loss. Fully integrated DC-DC voltage regulators implemented with short-channel CMOS processes are the prominent solution to shrink system size and reduce the overall power loss. However, short-channel CMOS devices have a relatively low breakdown voltage which makes them difficult to use for high voltage power-conversion regulators. Moreover, a high gate-charge of these devices increases power loss, resulting in reduced efficiency of these DC-DC converters.

Embodiments discussed herein illustrate a buck converter with a stacked MOSFET structure of which a number of power MOSFETs can be driven by the power stage itself, for example, without requiring driver circuits. Additionally, the gates of some of the power MOSFETs may be partially charged or discharged through the output inductor so that the gate-charge/discharge power loss is reduced. As a result, fully-integrated DC-DC converters may be implemented in short-channel processes, thus minimizing the sizes of power systems and improving the efficiency while simplifying the designs of driver circuits.

In some embodiments, some of the power MOSFETs in the cascode stack feature partially soft gate charge/discharge through the output inductor. In some embodiments, some of the power MOSFETs in the cascode stack are self-driven without requiring dedicated driver circuits. In some embodiments, for an input voltage PVIN, drain-source, gate-source, and gate-drain voltages of the power MOSFETs are kept within PVIN/n at all times or at substantially all times.

While six power MOSFETs are shown in some of the illustrated embodiments, any arbitrary number (i.e. n) of power MOSFETs can be reliably stacked.

The illustrated embodiments have the following advantageous aspects, among others: low gate-charge/discharge power loss; simplified gate driver circuit design; and scalable, flexible, and reliable architecture for stacking power MOSFETs for various input voltage requirements.

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein. For example, certain aspects and principles are discussed with reference to a buck switching power converter. However, as understood by those of ordinary skill in the art, the various aspects and principles may be used in embodiments of other types of switching power converters, such as resonant, boost, buck-boost, and flyback regulators. Furthermore, as understood by those of ordinary skill in the art, while the various aspects and principles are discussed herein with reference to use of a pulse width modulation (PWM) controller, other controllers and control schemes are used in alternative embodiments. In addition, in the embodiments discussed below, MOSFETs are used. However, in some embodiments other transistors or other switches are used.

The invention will be described primarily with a single type of regulator, more specifically a buck regulator, for clarity. The principles and aspects discussed herein may be applied to other regulator types according to principles understood by those of skill in the art.

In order to avoid performance limitations or damage to power switches with breakdown voltages that are less than the positive power supply, cascode output stages ("FET stacking") may be used. For example, as shown in FIG. 1, a series connection of switches, such as MOSFETs can be used so that the resulting breakdown voltage of the series connected switches is equal to the sum of the breakdown voltages of the individual switches. Thus, one can utilize relatively low-voltage switches in a high-voltage application.

Figure 3:
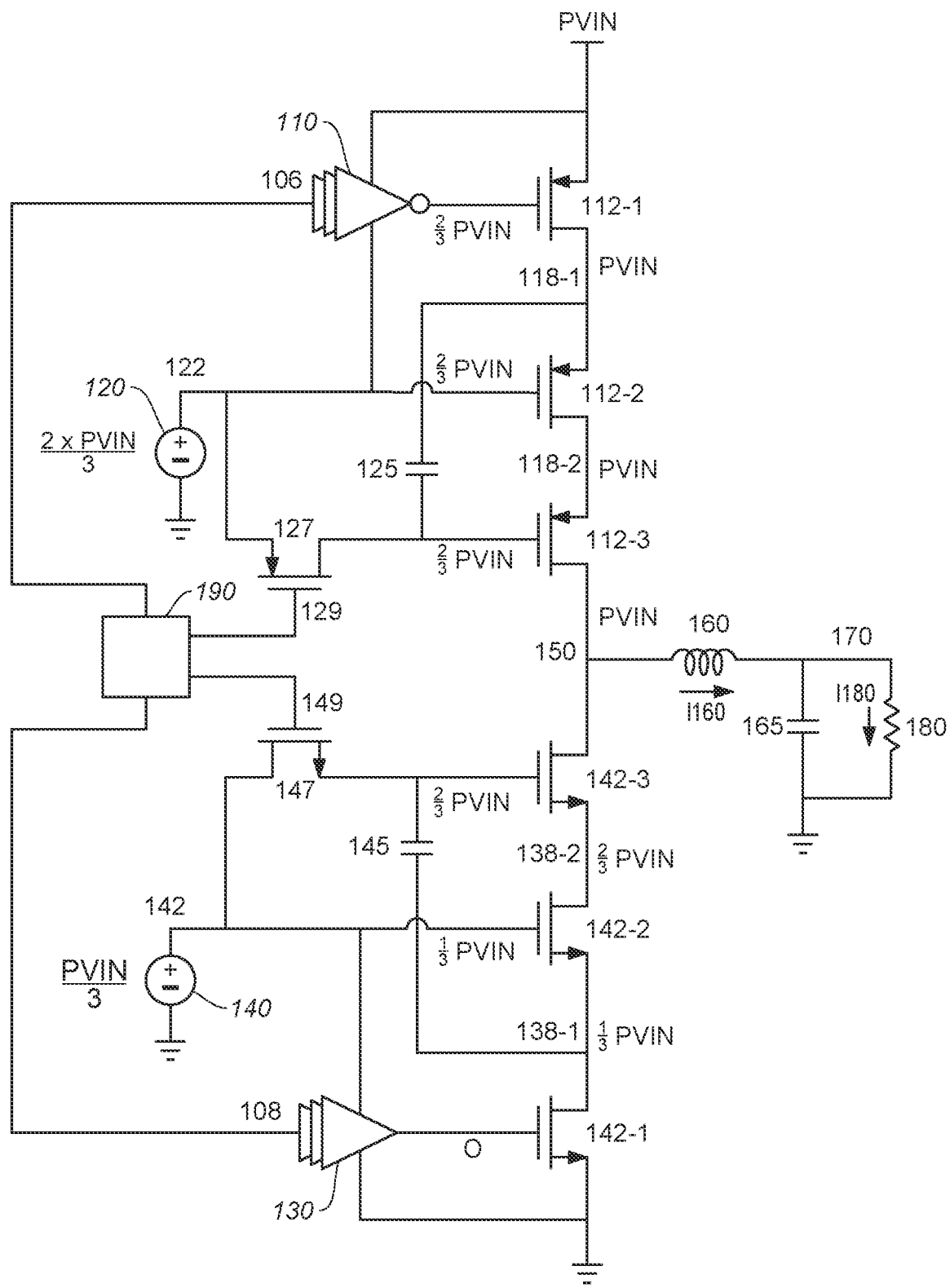
FIG. 3 is a schematic illustration of the stage of FIG. 1 in a particular state of operation.
Figure 4:
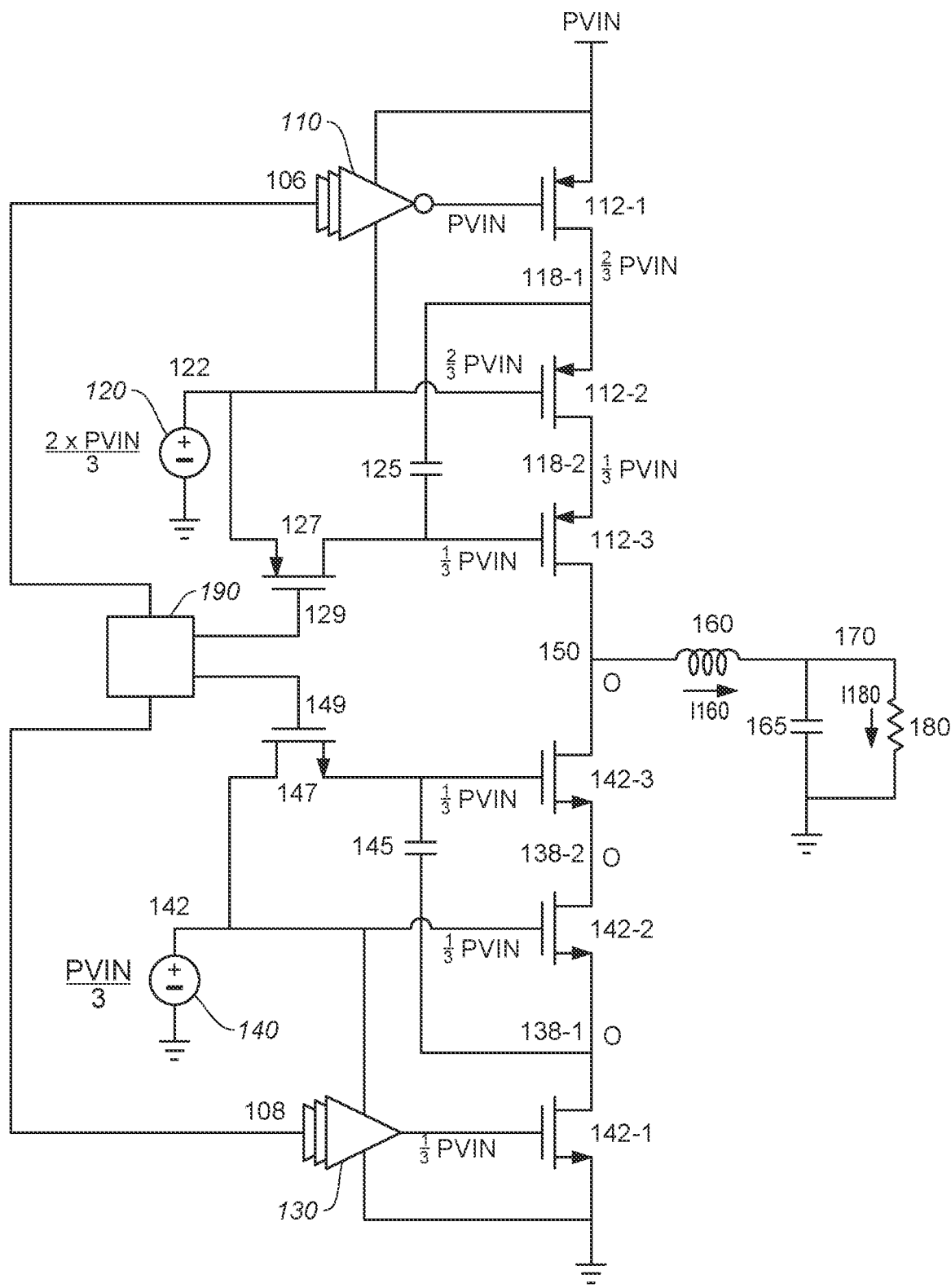
FIG. 4 is a schematic illustration of the stage of FIG. 1 in a particular state of operation.
Figure 5:
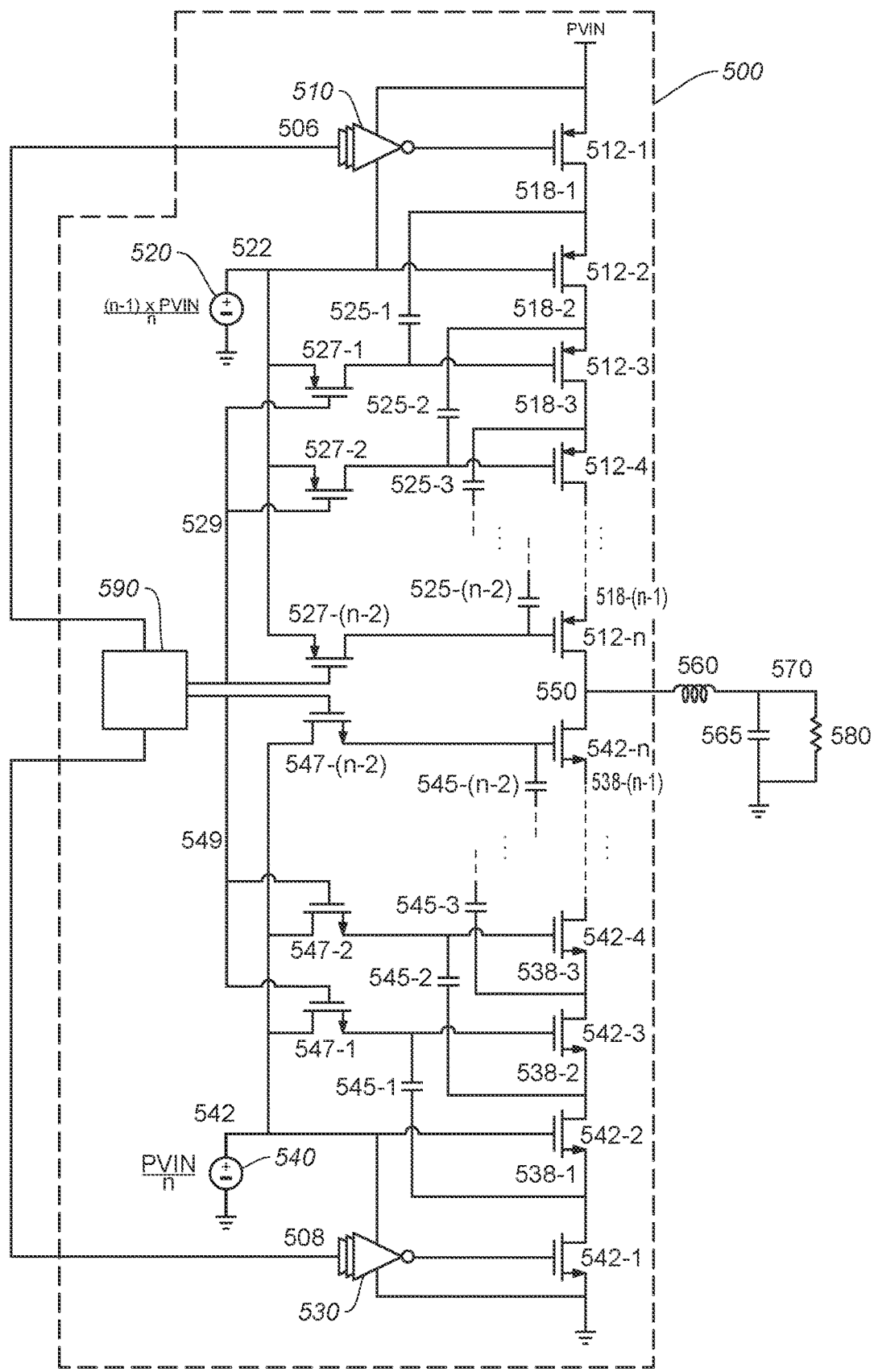
FIG. 5 is a schematic illustration of a stage of a switching voltage regulator according to an embodiment and FIG. 6 is a schematic illustration of a stage of a switching voltage regulator according to an embodiment.
Figure 6:
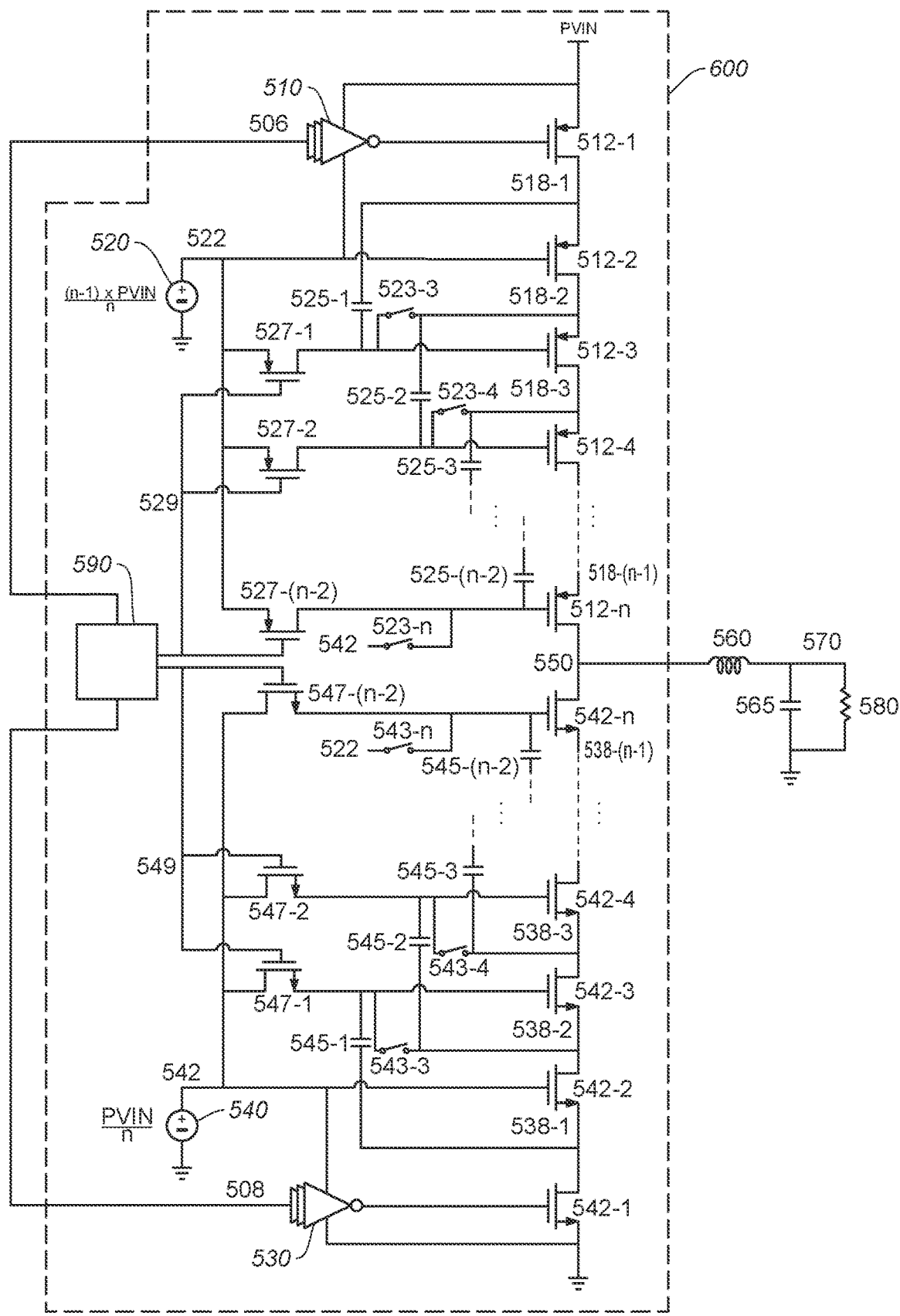

Features of embodiments that employ a cascode power converter output stage will now be discussed. The embodiments provide examples of a cascode power converter output stage topology which has low power loss at least because only one high side and one low side driver is needed for any number of cascode switches, and parasitic capacitances store charge which is used later conducted to the load. In addition, the circuit topology may be advantageously applied with any number of cascode switches. FIG. 1 is a schematic illustration of an example stage. FIGS. 2-4 illustrate example operation of the stage. FIGS. 5 and 6 illustrate alternative stage configurations.

FIG. 1 is a schematic illustration of a power converter stage 100 connected to a load represented by capacitance 165 and resistance 180 through load inductor 160 according to an embodiment. The various signals at inputs 106, 108, 129, and 149 are driven, by a controller 190 so as to cause power converter stage 100 to provide power to the load.

For example, the controller 190 may be configured to receive an indication of a target voltage for the load and to receive an indication of the actual output voltage at node 170 at the load. The controller 190 may be further configured to provide signals to the inputs 106, 108, 129, and 149 of power converter stage 100 in response to a difference between the indication of the actual voltage at node 170 and the indication of the target voltage, as understood by those of skill in the art.

As discussed in further detail below, a number of power MOSFETs of power converter stage 100 are driven by the power converter stage 100 itself. For example, in some embodiments these power MOSFETs are not driven by a driver circuit. Beneficially, this arrangement provides reduced power, area, and circuit design complexity.

Power converter stage 100 includes high side transistors 112-1, 112-2, and 112-3 connected in series between switching node 150 and positive power supply PVIN. Power converter stage 100 also includes inverting circuit 110, capacitor 125, switch 127, and bias voltage generator 120.

Furthermore, power converter stage 100 includes low side transistors 142-1, 142-2, and 142-3 connected in series between switching node 150 and negative power supply GND. Power converter stage 100 also includes inverting circuit 130, capacitor 145, switch 147, and bias voltage generator 140.

In some embodiments only high side transistor 112-1 and low side transistor 142-1 are switched on/off by the inverting circuits 110 and 130 respectively controlling the signals at the gates of high side transistor 112-1 and low side transistor 142-1, while all the other MOSFETs are turned on/off as a consequence of high side transistor 112-1 and low side transistor 142-1 being turned on/off and the signals at 129 and 149.

During operation, inverting buffer 110 causes high side transistor 112-1 to be selectively conductive according to a signal at input 106. In addition, non-inverting buffer 130 causes low side transistor 142-1 to be selectively conductive according to a signal at input 108. The signals at input 106 and at input 108 are coordinated, for example, by the controller 190 such that while high side transistor 112-1 is conductive, low side transistor 142-1 is non-conductive. Similarly, the signals at input 106 and at input 108 are also coordinated such that while low side transistor 142-1 is conductive, high side transistor 112-1 is non-conductive. In addition, the signals at input 106 and at input 108 are also coordinated such that times during which either high side transistor 112-1 is conductive or low side transistor 142-1 is conductive are separated by dead times, during which high side transistor 112-1 and low side transistor 142-1 are both non-conductive While the signal at input 106 causes high side transistor 112-1 to be conductive, the signal at input 129 causes switch 127 to be conductive. In some embodiments, the controller 190 controls the signal at input 129 so as to cause switch 127 to become conductive after high side transistor 112-3 becomes conductive. In some embodiments, switch 127 comprises a PMOS FET, and the controller 190 causes switch 127 to be conductive, for example, by causing the signal at input 129 to be equal to about ⅓ times the voltage at the positive power supply PVIN, and causes switch 127 to be non-conductive by causing the signal at input 129 to be equal to about ⅔ times the voltage at the positive power supply PVIN. Accordingly, the voltage swing at the gate of the swings by about ⅓.

While the signal at input 106 causes high side transistor 112-1 to be conductive, the gate voltages at high side transistors 112-2 and 112-3 are equal to the bias voltage at node 122 generated by bias voltage generator 120. In the illustrated embodiment, the bias voltage at node 122 is equal to ⅔ times the voltage at the positive power supply PVIN.

Therefore, while the signal at input 106 causes high side transistor 112-1 to be conductive, high side transistors 112-2 and 112-3 are also conductive, as the voltages at nodes 118-1 and 118-2 become equal to the voltage at the positive power supply PVIN, and the bias voltage generated by bias voltage generator 120 (=⅔ times the voltage at the positive power supply PVIN) is less than the voltage at the positive power supply PVIN by more than a threshold voltage of high side transistors 112-2 and 112-3.

Bias voltage generator 120 may be any suitable bias voltage generation circuit.

While the signal at input 106 causes high side transistor 112-1 to be conductive, the signal at input 108 causes low side transistor 142-1 to be non-conductive, and the signal at input 149 causes switch 147 to be non-conductive. In some embodiments, the controller 190 controls the signal at input 149 so as to cause switch 147 to become non-conductive before low side transistor 142-3 becomes non-conductive. In some embodiments, switch 147 comprises an NMOS FET, and the controller 190 causes switch 147 to be non-conductive by causing the signal at input 149 to be equal to about ⅓ times the voltage at the positive power supply PVIN, and causes switch 147 to be conductive by causing the signal at input 149 to be equal to about ⅔ times the voltage at the positive power supply PVIN. Accordingly, the voltage swing at the gate of the swings by about ⅓ times the voltage at the positive power supply PVIN.

Consequently, in some embodiments, the voltage at node 138-2 is equal to ⅔ times the voltage at the positive power supply PVIN and the voltage at node 138-1 is equal to ⅓ times the voltage at the positive power supply PVIN. In addition, in some embodiments, the voltage at the gate of low side transistor 142-3 is equal to ⅔ times the voltage at the positive power supply PVIN, and the voltage at the gate of low side transistor 142-2 is equal to ⅓ times the voltage at the positive power supply PVIN. Therefore, in this particular example, low side transistors 142-1, 142-2, and 142-3 are non-conductive.

While the signal at input 108 causes low side transistor 142-1 to be conductive, the signal at input 149 causes switch 147 to be conductive. In some embodiments, the controller 190 controls the signal at input 149 so as to cause switch 147 to become conductive after low side transistor 142-3 becomes conductive. Accordingly, while the signal at input 108 causes low side transistor 142-1 to be conductive, the gate voltages at low side transistors 142-2 and 142-3 are equal to the bias voltage generated by bias voltage generator 140. In the illustrated embodiment, the gate voltages at low side transistors 142-2 and 142-3 are equal to ⅓ times the voltage at the positive power supply PVIN.

Therefore, while the signal at input 108 causes low side transistor 142-1 to be conductive, low side transistors 142-2 and 142-3 are also conductive, as the voltages at nodes 138-1 and 138-2 become equal to the voltage at the negative power supply GND, and the bias voltage At node 142 generated by bias voltage generator 140 (=⅓ times the voltage at the positive power supply PVIN) is greater than the voltage at the negative power supply GND by more than a threshold voltage of low side transistors 142-2 and 142-3.

Bias voltage generator 140 may be any suitable bias voltage generation circuit.

While the signal at input 108 causes low side transistor 142-1 to be conductive, the signal at input 106 causes high side transistor 112-1 to be non-conductive, and the signal at input 129 causes switch 127 to be non-conductive. In some embodiments, the controller 190 controls the signal at input 129 so as to cause switch 127 to become non-conductive before high side transistor 112-3 becomes non-conductive. In some embodiments, the voltage at node 118-1 is equal to ⅔ times the voltage at the positive power supply PVIN and the voltage at node 118-2 is equal to ⅓ times the voltage at the positive power supply PVIN. In addition, in some embodiments, the voltage at the gate of high side transistor 112-2 is equal to ⅔ times the voltage at the positive power supply PVIN, and the voltage at the gate of high side transistor 112-3 is equal to ⅓ times the voltage at the positive power supply PVIN. Therefore, in this particular example, high side transistors 112-1, 112-2, and 112-3 are non-conductive.

Figure 2A:
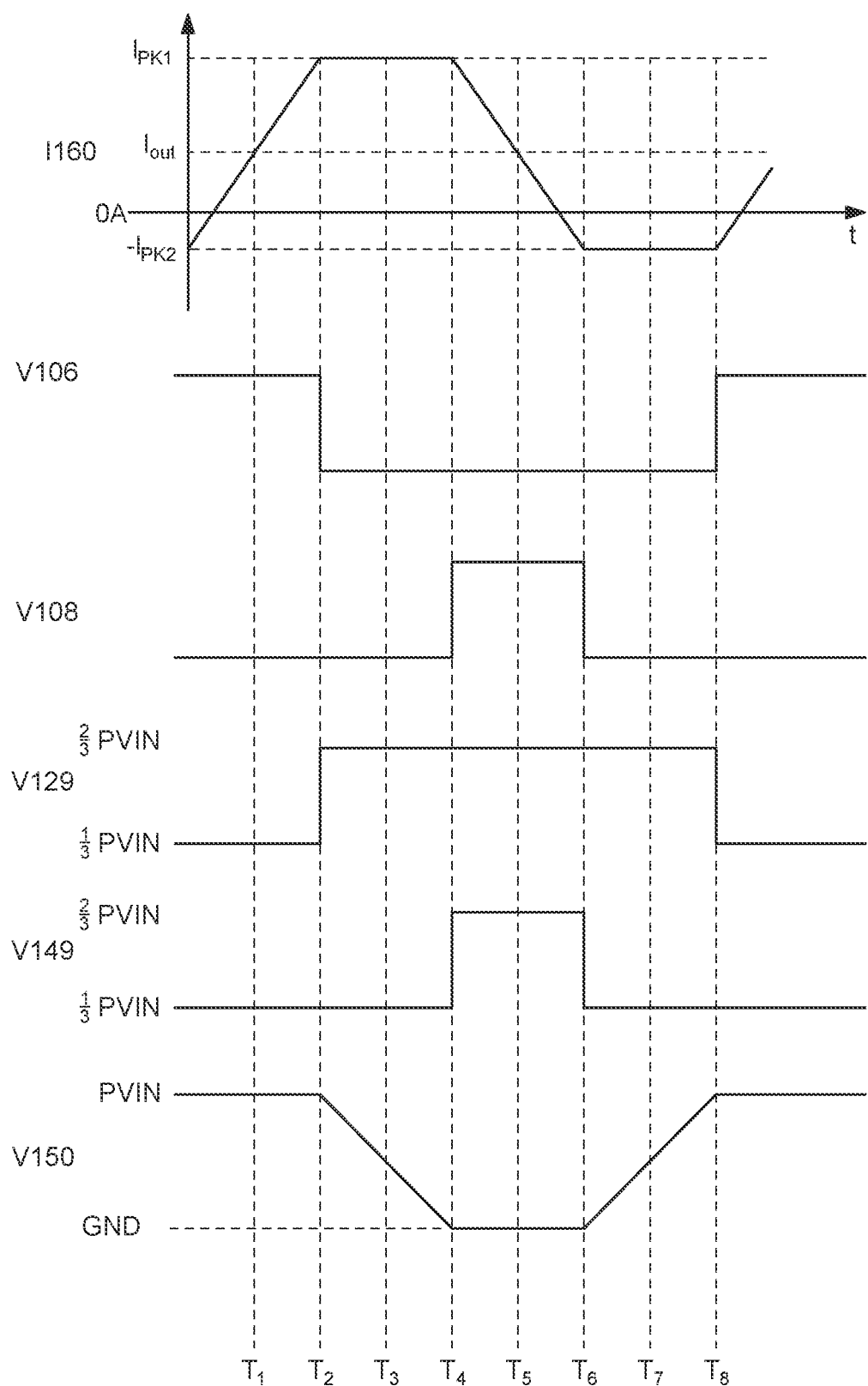
FIGS. 2A and 2B are waveform diagrams illustrating operation of the stage of FIG. 1 in first and second case usage scenarios.
Figure 2B:
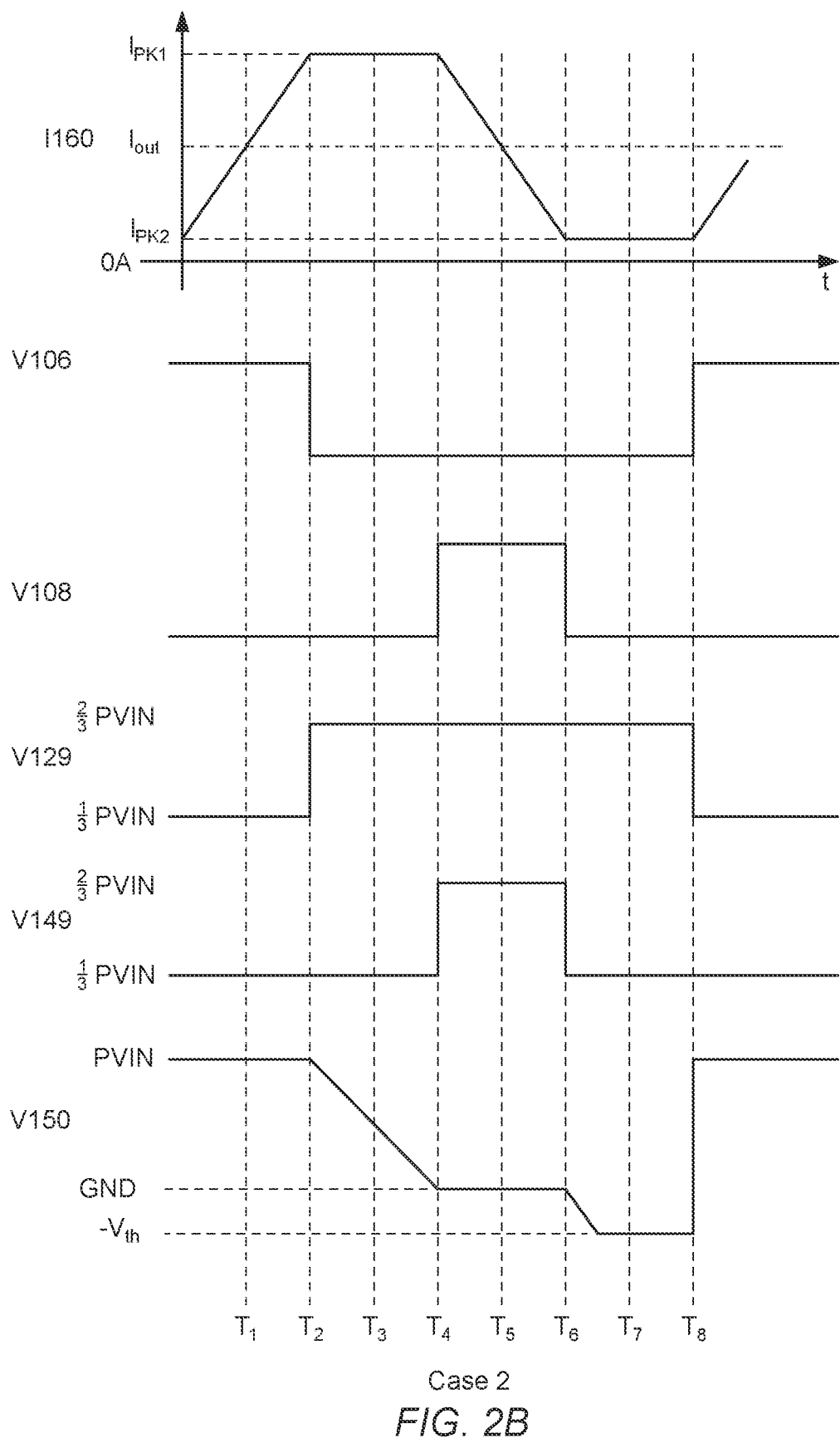

FIGS. 2A and 2B are waveform diagrams illustrating operation of the stage of FIG. 1 in Case 1 and Case 2 usage scenarios, respectively.

At time T1, the signal at input 106 is high, and causes high side transistor 112-1 to be conductive, and the signal at input 108 is low, causing low side transistor 142-1 to be non-conductive. In addition, the signal at input 129 causes switch 127 to be conductive, and the signal at input 149 causes switch 147 to be non-conductive.

Accordingly, in this particular example, the high side transistors 112-1, 112-2 and 112-3 conduct current I160 from positive power supply PVIN to the load through inductor 160, and the voltage V150 at switching node 150 is equal or substantially equal to the voltage at positive power supply PVIN.

At time T2, the signal at input 106 transitions low, and causes high side transistor 112-1 to become non-conductive, while the signal at input 108 remains low, and causes low side transistor 142-1 to remain non-conductive. In addition, the signal at input 129 causes switch 127 to become non-conductive, and the signal at input 149 continues to cause switch 147 to be non-conductive.

Accordingly, in this particular example the high side transistors 112-1, 112-2 and 112-3 stop conducting current I160 from positive power supply PVIN to the load through inductor 160. Consequently, because of the continuing current I160 through inductor 160, the voltage V150 at switching node 150 begins to drop, discharging the parasitic capacitances of high side transistors 112-1, 112-2 and 112-3, and low side transistor 142-3, which are connected to nodes 118-1, 118-2, 150, and the gate of high side transistor 112-3 (through capacitor 125) and discharging the other parasitic capacitances which are connected to nodes 118-1, 118-2, 150, 138-1, 138-2, and the gate of low side transistor 142-1 (through capacitor 145). Because these capacitances are discharged to the load through inductor 160, these capacitances are lossless, resulting in reduced power loss.

As the voltage V150 at switching node 150 begins to drop, the voltages at nodes 118-1, and 118-2 also begin to drop. The voltage difference between the voltage $V_{PVIN}$ at positive power supply PVIN and the voltage V150 at switching node 150 ($V_{PVIN}$–V150) V150 is divided among the high side transistors 112-1, 112-2 and 112-3 such that the voltage at node 118-2 is equal or substantially equal to V150+⅓×($V_{PVIN}$–V150), and the voltage at node 118-1 is equal or substantially equal to V150+⅔×($V_{PVIN}$–V150), as understood by those of skill in the art.

In addition, because the switch 127 is non-conductive, capacitor 125 causes the voltage at the gate of high side transistor 112-3 to drop. Capacitor 125 is sized relative to the parasitic capacitances at the gate of high side transistor 112-3 such that the voltage drop at the gate of high side transistor 112-3 is similar to the voltage drop at node 118-1, as understood by those of skill in the art.

As the voltage V150 at switching node 150 begins to drop, the voltages at nodes 138-1 and 138-2 also begin to drop. The voltage difference between the voltage V150 at switching node 150 and the voltage at negative power supply GND ($V_{GND}$–V150) V150 is divided among the low side transistors 142-1, 142-2, and 142-3 such that the voltage at node 138-1 is equal or substantially equal to ⅓×V150 (V150–$V_{GND}$), and the voltage at node 138-2 is equal or substantially equal to ⅔×(V150–$V_{GND}$), as understood by those of skill in the art.

In addition, because the switch 147 is non-conductive, capacitor 145 causes the voltage at the gate of low side transistor 142-3 to drop. Capacitor 145 is sized relative to the parasitic capacitances at the gate of low side transistor 142-3 such that the voltage drop at the gate of low side transistor 142-3 is similar to the voltage drop at node 138-1, as understood by those of skill in the art.

At time T3, the signal at input 106 remains low, and causes high side transistor 112-1 to remain non-conductive, while the signal at input 108 remains low, and causes low side transistor 142-1 to remain non-conductive. In addition, the signal at input 129 causes switch 127 to remain non-conductive, and the signal at input 149 continues to cause switch 147 to be non-conductive.

Accordingly, in this particular example, the high side transistors 112-1, 112-2 and 112-3 do not conduct current from positive power supply PVIN to the load through inductor 160, and the low side transistors 142-1, 142-2, and 142-3 do not conduct current from the load to negative power supply GND through inductor 160. Consequently, because of the continuing current I160 through inductor 160, the voltage V150 at switching node 150 continues to drop, further discharging the parasitic capacitances of high side transistor 112-3 and low side transistor 142-3, which are connected to node 150, and discharging the other parasitic capacitances which are connected to node 150. The discharging of the parasitic capacitances contributes to a reduced power-loss for the circuit.

As the voltage V150 at switching node 150 continues to drop, the voltages at nodes 118-1 and 118-2 also continue to drop, further discharging the parasitic capacitances of high side transistors 112-1, 112-2 and 112-3 which are connected to nodes 118-1 and 118-2, and discharging the other parasitic capacitances which are connected to nodes 118-1 and 118-2. The voltage difference between the voltage $V_{PVIN}$ at positive power supply PVIN and the voltage V150 at switching node 150 ($V_{PVIN}$–V150) is divided among the high side transistors 112-1, 112-2 and 112-3 such that the voltage at node 118-2 is equal or substantially equal to V150+⅓×($V_{PVIN}$–V150), and the voltage at node 118-1 is equal or substantially equal to V150+⅔×($V_{PVIN}$–V150), as understood by those of skill in the art. Accordingly, the drain to source voltages (Vds) of high side transistors 112-1, 112-2 and 112-3 remain substantially equal, and remain less than a maximum threshold Vds of high side transistors 112-1, 112-2 and 112-3.

In addition, because the switch 127 is non-conductive, capacitor 125 causes the voltage at the gate of high side transistor 112-3 to drop. Capacitor 125 is sized relative to the parasitic capacitances at the gate of high side transistor 112-3 such that the voltage drop at the gate of high side transistor 112-3 is similar to the voltage drop at node 118-1, as understood by those of skill in the art. Accordingly, the gate to source (Vgs) and gate to drain (Vgd) voltages of high side transistor 112-3 remain less than a maximum threshold Vgs or Vgd of high side transistor 112-3.

Because the gate voltage of high side transistor 112-1 and 112-2 remain at ⅔×$V_{PVIN}$, the gate to source (Vgs) and gate to drain (Vgd) voltages of high side transistors 112-1 and 112-2 remain less than a maximum threshold Vgs or Vgd of high side transistors 112-1 and 112-2, as understood by those of skill in the art.

As the 150 voltage at switching node 150 continues to drop, the voltages at nodes 138-1 and 138-2 also continue to drop. The voltage difference between the voltage V150 at switching node 150 and the voltage at negative power supply GND (V150–$V_{GND}$) is divided among the low side transistors 142-1, 142-2, and 142-3 such that the voltage at node 138-1 is equal or substantially equal to ⅓×(V150–$V_{GND}$), and the voltage at node 138-2 is equal or substantially equal to ⅔×(V150–$V_{GND}$), as understood by those of skill in the art. Accordingly, the drain to source voltages (Vds) of low side transistors 142-1, 142-2, and 142-3 remain substantially equal, and remain less than a maximum threshold Vds of low side transistors 142-1, 142-2, and 142-3.

In addition, because the switch 147 is non-conductive, capacitor 145 causes the voltage at the gate of high side transistor 112-3 to continue to drop. Capacitor 145 is sized relative to the parasitic capacitances at the gate of low side transistor 142-3 such that the voltage drop at the gate of low side transistor 142-3 is similar to the voltage drop at node 138-1, as understood by those of skill in the art. Accordingly, the gate to source (Vgs) and gate to drain (Vgd) voltages of low side transistor 142-3 remain less than a maximum threshold Vgs or Vgd of low side transistor 142-3.

Because the gate voltage of low side transistor 142-1 and 142-1 remain at ⅓×$V_{PVIN}$, the gate to source (Vgs) and gate to drain (Vgd) voltages of low side transistors 142-1 and 142-1 remain less than a maximum threshold Vgs or Vgd of low side transistors 142-1 and 142-1, as understood by those of skill in the art.

At time T4, the signal at input 106 remains low, and causes high side transistor 112-1 to remain non-conductive, and the signal at input 108 transitions high, and causes low side transistor 142-1 to become conductive. In addition, the signal at input 129 causes switch 127 to remain non-conductive, and the signal at input 149 causes switch 147 to become conductive.

Accordingly, in some embodiments, the high side transistors 112-1, 112-2 and 112-3 do not conduct current from positive power supply PVIN to the load through inductor 160, and, at a time after T4, the low side transistors 142-1, 142-2, and 142-3 begin to conduct current I160 from the load to negative power supply GND through inductor 160. Consequently, the voltage V150 at switching node 150 becomes or remains equal or substantially equal to the voltage at negative power supply GND.

At time T5, the signal at input 106 remains low, and causes high side transistor 112-1 to remain non-conductive, and the signal at input 108 remains high, and causes low side transistor 142-1 to remain conductive. In addition, the signal at input 129 causes switch 127 to be non-conductive, and the signal at input 149 causes switch 147 to be conductive.

Accordingly, in this particular example, the high side transistors 112-1, 112-2 and 112-3 do not conduct current from positive power supply PVIN to the load through inductor 160, and the low side transistors 142-1, 142-2, and 142-3 do conduct current from the load to negative power supply GND through inductor 160. Consequently, the voltage V150 at switching node 150 remains equal or substantially equal to the voltage at negative power supply GND.

At time T6, the signal at input 108 transitions low, and causes low side transistor 142-1 to become non-conductive, while the signal at input 106 remains low, and causes high side transistor 112-1 to remain non-conductive. In addition, the signal at input 149 causes switch 147 to become conductive, and the signal at input 129 continues to cause switch 127 to be non-conductive.

Accordingly, at least for reasons discussed elsewhere herein, and as understood by those of skill in the art, the low side transistors 142-1, 142-2, and 142-3 stop conducting current I160 from the load to negative power supply GND through inductor 160.

Time Interval Between T6 and T8 for Case 1.

Due to the relatively low average load current I180 through resistance 180, the current I160 through the inductor is less than 0 A, and flows backward to switching node 150. Because of the continuing current I160 through inductor 160, the voltage V150 at switching node 150 begins to rise, charging the parasitic capacitances of high side transistor 112-3, and low side transistor 142-3, which are connected to node 150, and charging the other parasitic capacitances which are connected to node 150.

Because the voltage V150 at switching node 150 begins to rise, the voltages at nodes 138-1 and 138-2 also begin to rise. The voltage difference between the voltage V150 at switching node 150 and the voltage at negative power supply GND (V150–$V_{GND}$) is divided among the low side transistors 142-1, 142-2, and 142-3 such that the voltage at node 138-1 is equal or substantially equal to ⅓×(V150–$V_{GND}$), and the voltage at node 138-2 is equal or substantially equal to ⅔×(V150–$V_{GND}$), as understood by those of skill in the art.

Because the switch 147 is non-conductive, capacitor 145 causes the voltage at the gate of low side transistor 142-3 to rise. Capacitor 145 is sized relative to the parasitic capacitances at the gate of low side transistor 142-3 such that the voltage rise at the gate of low side transistor 142-3 is similar to the voltage rise at node 138-1, as understood by those of skill in the art.

As the voltage V150 at switching node 150 begins to rise, the voltages at nodes 118-1 and 118-2 also begin to rise. The voltage difference between the voltage at positive power supply PVIN and the voltage V150 at switching node 150 ($V_{PVIN}$–V150) is divided among the high side transistors 112-1, 112-2 and 112-3 such that the voltage at node 118-2 is equal or substantially equal to V150+⅓×($V_{PVIN}$–V150), and the voltage at node 118-1 is equal or substantially equal to V150+⅔×($V_{PVIN}$–V150), as understood by those of skill in the art.

In addition, because the switch 127 is non-conductive, capacitor 125 causes the voltage at the gate of high side transistor 112-3 to rise. Capacitor 125 is sized relative to the parasitic capacitances at the gate of high side transistor 112-3 such that the voltage rise at the gate of high side transistor 112-3 is similar to the voltage rise at node 118-1, as understood by those of skill in the art.

At time T7, the signal at input 108 remains low, and causes low side transistor 142-1 to remain non-conductive, while the signal at input 106 remains low, and causes high side transistor 112-1 to remain non-conductive. In addition, the signal at input 149 continues to cause switch 147 to be non-conductive, and the signal at input 129 causes switch 127 to remain non-conductive.

Accordingly, in this particular example, the low side transistors 142-1, 142-2, and 142-3 do not conduct current from the load to negative power supply GND through inductor 160, and the high side transistors 112-1, 112-2 and 112-3 do not conduct current from positive power supply PVIN to the load through inductor 160. Consequently, because of the continuing current I160 through inductor 160, the voltage V150 at switching node 150 continues to rise, further charging the parasitic capacitances of high side transistor 112-3, and low side transistor 142-3, which are connected to node 150, and charging the other parasitic capacitances which are connected to node 150.

As the voltage V150 at switching node 150 continues to rise, the voltages at nodes 118-1 and 118-2 also continue to rise, further charging the parasitic capacitances of high side transistors 112-1, 112-2 and 112-3 which are connected to nodes 118-1 and 118-2, and discharging the other parasitic capacitances which are connected to nodes 118-1 and 118-2. Because these capacitances are charged by through inductor 160 and discharged to the load through inductor 160, these capacitances are lossless.

The voltage difference between the voltage at positive power supply PVIN and the voltage V150 at switching node 150 ($V_{PVIN}$–V150) is divided among the high side transistors 112-1, 112-2 and 112-3 such that the voltage at node 118-2 is equal or substantially equal to V150+⅓×($V_{PVIN}$–V150), and the voltage at node 118-1 is equal or substantially equal to V150+⅔×($V_{PVIN}$–V150), as understood by those of skill in the art. Accordingly, the drain to source voltages (Vds) of high side transistors 112-1, 112-2 and 112-3 remain substantially equal, and remain less than a maximum threshold Vds of high side transistors 112-1, 112-2 and 112-3.

In addition, because the switch 127 is non-conductive, capacitor 125 causes the voltage at the gate of high side transistor 112-3 to rise. Capacitor 125 is sized relative to the parasitic capacitances at the gate of high side transistor 112-3 such that the voltage rise at the gate of high side transistor 112-3 is similar to the voltage rise at node 118-1, as understood by those of skill in the art. Accordingly, the gate to source (Vgs) and gate to drain (Vgd) voltages of high side transistor 112-3 remain less than a maximum threshold Vgs or Vgd of high side transistor 112-3.

Because the gate voltage of high side transistor 112-1 and 112-2 remain at ⅔×$V_{PVIN}$, the gate to source (Vgs) and gate to drain (Vgd) voltages of high side transistors 112-1 and 112-2 remain less than a maximum threshold Vgs or Vgd of high side transistors 112-1 and 112-2, as understood by those of skill in the art.

As the voltage V150 at switching node 150 continues to rise, the voltages at nodes 138-1 and 138-2 also continue to rise. The voltage difference between the voltage V150 at switching node 150 and the voltage at negative power supply GND (V150–$V_{GND}$) is divided among the low side transistors 142-1, 142-2, and 142-3 such that the voltage at node 138-1 is equal or substantially equal to ⅓×(V150–$V_{GND}$), and the voltage at node 138-2 is equal or substantially equal to ⅔×(V150–$V_{GND}$), as understood by those of skill in the art. Accordingly, the drain to source voltages (Vds) of low side transistors 142-1, 142-2, and 142-3 remain substantially equal, and remain less than a maximum threshold Vds of low side transistors 142-1, 142-2, and 142-3.

In addition, because the switch 147 is non-conductive, capacitor 145 causes the voltage at the gate of high side transistor 112-3 to continue to rise. Capacitor 145 is sized relative to the parasitic capacitances at the gate of low side transistor 142-3 such that the voltage rise at the gate of low side transistor 142-3 is similar to the voltage rise at node 138-1, as understood by those of skill in the art. Accordingly, the gate to source (Vgs) and gate to drain (Vgd) voltages of low side transistor 142-3 remain less than a maximum threshold Vgs or Vgd of low side transistor 142-3.

Because the gate voltage of low side transistor 142-1 and 142-1 remain at ⅓×$V_{PVIN}$, the gate to source (Vgs) and gate to drain (Vgd) voltages of low side transistors 142-1 and 142-1 remain less than a maximum threshold Vgs or Vgd of low side transistors 142-1 and 142-1, as understood by those of skill in the art.

Time Interval Between T6 and T8 for Case 2.

At time T6, because the relatively high average load current I180 through resistance 180, the current I160 through inductor 160 remains positive and flows toward capacitance 165 and resistance 180. As illustrated, the voltage V150 at switching node 150 reduces until being clamped to about one threshold voltage below the ground voltage by the low side transistors 142-1, 142-2, and 142-3. Low side transistor 142-1 is effectively diode-connected, and low side transistors 142-2 and 142-3 are saturated and conduct current I160 from GND to the load through inductor 160. The voltage V150 at switching node 150 stays at the negative clamped voltage between T6 and T8 until the voltage at input 106 rises at T8, as explained later.

Time Interval at T8 for Cases 1 and 2

At time T8, for both Case 1 and Case 2, the signal at input 108 remains low, and causes low side transistor 142-1 to remain non-conductive, and the signal at input 106 transitions high, and causes high side transistor 112-1 to become conductive. In addition, the signal at input 129 causes switch 127 to become conductive, and the signal at input 149 causes switch 147 to remain non-conductive.

Accordingly, in this particular example, the low side transistors 142-1, 142-2, and 142-3 do not conduct current from the load to negative power supply GND through inductor 160, and, at some time after T8, the high side transistors 112-1, 112-2 and 112-3 begin to conduct current from positive power supply PVIN to the load through inductor 160, charging or preserving the charge of the parasitic capacitances of high side transistors 112-1, 112-2 and 112-3, and low side transistor 142-3, which are connected to nodes 118-1, 118-2, and 150, and charging the other parasitic capacitances which are connected to nodes 118-1, 118-2, and 150. Consequently, the voltage V150 at switching node 150 becomes or remains equal or substantially equal to the voltage at positive power supply PVIN.

In both Case 1 and Case 2, the voltages at node 118-1, node 118-2, the gate of high side transistor 112-1, the gate of low side transistor 142-1, and node 150 can vary as discussed above during the rising edge of voltage V150, thus ensuring all the voltage stresses are within the breakdown limit.

FIG. 3 is a schematic illustration of the stage 100 of FIG. 1 at time T1 of FIGS. 2A and 2B.

As illustrated, the voltages V150, at nodes 118-1, 118-2, and 150 are all equal to the voltage at power supply PVIN. Accordingly, the drain to source voltages (Vds) of high side transistors 112-1, 112-2 and 112-3 are zero, which is less than the maximum threshold Vds of high side transistors 112-1, 112-2 and 112-3. Accordingly, high side transistors 112-1, 112-2 and 112-3 do not suffer Vds overvoltage stress.

In addition, the voltages at the gates of high side transistors 112-1, 112-2 and 112-3 can all be equal to ⅔ times the voltage at power supply PVIN. Accordingly, the gate to source (Vgs) and gate to drain (Vgd) voltages of high side transistors 112-1, 112-2, and 112-3 are no greater than ⅓ times the voltage at power supply PVIN, which is less than the maximum threshold Vgs or Vgd of high side transistors 112-1, 112-2, and 112-3. Accordingly, high side transistors 112-1, 112-2 and 112-3 are protected from Vgs or Vgd overvoltage stress.

As illustrated, the voltage at node 138-2, is equal to ⅔ times the voltage at power supply PVIN, and the voltage at node 138-1, is equal to ⅓ times the voltage at power supply PVIN. Accordingly, the drain to source voltages (Vds) of low side transistors 142-1, 142-2, and 142-3 are each equal to ⅓ times the voltage at power supply PVIN, which is less than the maximum threshold Vds of low side transistors 142-1, 142-2, and 142-3. Accordingly, low side transistors 142-1, 142-2, and 142-3 do not suffer Vds overvoltage stress.

In addition, the voltage at the gate of low side transistor 142-3 is equal to ⅔ times the voltage at power supply PVIN, the voltage at the gate of low side transistor 142-2 is equal to ⅓ times the voltage at power supply PVIN, and the voltage at the gate of low side transistor 142-1 is equal to 0, or the voltage at power supply GND. Accordingly, the gate to source (Vgs) and gate to drain (Vgd) voltages of low side transistors 142-1, 142-2, and 142-3 are no greater than ⅓ times the voltage at power supply PVIN, which is less than the maximum threshold Vgs or Vgd of low side transistors 142-1, 142-2, and 142-3. Accordingly, low side transistors 142-1, 142-2, and 142-3 are protected from Vgs or Vgd overvoltage stress.

FIG. 4 is a schematic illustration of stage 100 of FIG. 1 at time T5 of FIGS. 2A and 2B.

As illustrated, the voltages at nodes 138-1, 138-2, and 550 are all equal to the 0 voltage at power supply GND. Accordingly, the drain to source voltages (Vds) of low side transistors 142-1, 142-2, and 142-3 are zero, which is less than the maximum threshold Vds of low side transistors 142-1, 142-2, and 142-3. Accordingly, low side transistors 142-1, 142-2, and 142-3 are protected from Vds overvoltage stress.

In addition, the voltages at the gates of low side transistors 142-1, 142-2, and 142-3 are all equal to ⅓ times the voltage at power supply PVIN. Accordingly, the gate to source (Vgs) and gate to drain (Vgd) voltages of low side transistors 142-1, 142-2, and 142-3 are no greater than ⅓ times the voltage at power supply PVIN, which is less than the maximum threshold Vgs or Vgd of low side transistors 142-1, 142-2, and 142-3. Accordingly, low side transistors 142-1, 142-2, and 142-3 are protected from Vgs or Vgd overvoltage stress.

As illustrated, the voltage at node 118-2, is equal to ⅓ times the voltage at power supply PVIN, and the voltage at node 118-1, is equal to ⅔ times the voltage at power supply PVIN. Accordingly, the drain to source voltages (Vds) of high side transistors 112-1, 112-2 and 112-3 are each equal to ⅓ times the voltage at power supply PVIN, which is less than the maximum threshold Vds of high side transistors 112-1, 112-2 and 112-3. Accordingly, high side transistors 112-1, 112-2 and 112-3 are protected from Vds overvoltage stress.

In addition, the voltage at the gate of high side transistor 112-3 is equal to ⅓ times the voltage at power supply PVIN, the voltage at the gate of high side transistor 112-2 is equal to ⅔ times the voltage at power supply PVIN, and the voltage at the gate of high side transistor 112-1 is equal to the voltage at power supply PVIN. Accordingly, the gate to source (Vgs) and gate to drain (Vgd) voltages of high side transistors 112-1, 112-2 and 112-3 are no greater than ⅓ times the voltage at power supply PVIN, which is less than the maximum threshold Vgs or Vgd of high side transistors 112-1, 112-2 and 112-3. Accordingly, high side transistors 112-1, 112-2 and 112-3 are protected from Vgs or Vgd overvoltage stress.

FIG. 5 is a schematic illustration of a power converter stage 500 connected to a load represented by capacitance 565 and resistance 580 through load inductor 560 according to an embodiment. The various signals at inputs 506, 508, 529, and 549 are driven by controller 590 so as to cause power converter stage 500 to provide power to the load.

For example, the controller 590 may be configured to receive an indication of a target voltage for the load and to receive an indication of the actual output voltage at the node 570 at the load. The controller 590 may be further configured to provide signals to the inputs 506, 508, 529, and 549 of power converter stage 500 in response to a difference between the indication of the actual voltage and the indication of the target voltage, as understood by those of skill in the art.

Power converter stage 500 includes high side transistors 512-1, and 512-2 through 512-*n* connected in series between switching node 550 and positive power supply PVIN. Power converter stage 500 also includes inverting circuit 510, capacitors 525-1 through 525-(*n*−2), switches 527-1 through 527-(*n*−2), and bias voltage generator 520.

Furthermore, power converter stage 500 includes low side transistors 542-1, and 542-2 through 542-*n* connected in series between switching node 550 and negative power supply GND. Power converter stage 500 also includes inverting circuit 530, capacitors 545-1 through 545-(*n*−2), switches 547-1 through 547-(*n*−2), and bias voltage generator 540.

It is noteworthy that only high side transistor 512-1 and low side transistor 542-1 are switched on/off by the inverting circuits 510 and 530 respectively controlling the signals at the gates of high side transistor 512-1 and low side transistor 542-1, while all the other MOSFETs are turned on/off as a consequence of high side transistor 512-1 and low side transistor 542-1 being turned on/off and the signals at 529 and 549.

During operation, inverting buffer 510 causes high side transistor 512-1 to be selectively conductive according to a signal at input 506. In addition, non-inverting buffer 530 causes low side transistor 542-1 to be selectively conductive according to a signal at input 508. The signals at input 506 and at input 508 are coordinated, for example, by the controller 590 such that while high side transistor 512-1 is conductive, low side transistor 542-1 is non-conductive. Similarly, the signals at input 506 and at input 508 are also coordinated such that while low side transistor 542-1 is conductive, high side transistor 512-1 is non-conductive. In addition, the signals at input 506 and at input 508 are also coordinated such that times during which either high side transistor 512-1 is conductive or low side transistor 542-1 is conductive are separated by dead times, during which high side transistor 512-1 and low side transistor 542-1 are both non-conductive While the signal at input 506 causes high side transistor 512-1 to be conductive, the signal at input 529 causes switches 527-1 through 527-(*n*–2) to be conductive. In some embodiments, the controller 590 controls the signal at input 529 so as to cause switches 527-1 through 527-(*n*–2) to become conductive after high side transistor 512-*n* becomes conductive. In addition, while the signal at input 506 causes high side transistor 512-1 to be conductive, the signal at input 508 causes low side transistor 542-1 to be non-conductive, and the signal at input 549 causes switches 547-1 through 547-(*n*–2) to be non-conductive. In some embodiments, the controller 590 controls the signal at input 549 so as to cause switches 547-1 through 547-(*n*–2) to become non-conductive before low side transistor 542-*n* becomes non-conductive. Consequently, at least for reasons similar to those discussed in further detail elsewhere herein, for example, with reference to the operation of power converter stage 100, the voltage at nodes 518-X are equal to (1-X/n) times the voltage at the positive power supply PVIN. In addition, at least for reasons similar to those discussed in further detail elsewhere herein, for example, with reference to the operation of power converter stage 100, the voltages at the gates of high side transistors 512-X are equal to (1–(X–1)/n) times the voltage at the positive power supply PVIN. Therefore, high side transistors 512-1 through 512-*n* are non-conductive.

While the signal at input 508 causes low side transistor 542-1 to be conductive, the signal at input 506 causes high side transistor 512-1 to be non-conductive, and the signal at input 529 causes switches 527-1 through 527-(*n*–2) to be non-conductive. In some embodiments, the controller 590 controls the signal at input 529 so as to cause switches 527-1 through 527-(*n*–2) to become non-conductive before high side transistor 512-*n* becomes non-conductive. In addition, while the signal at input 508 causes low side transistor 542-1 to be conductive, the signal at input 549 causes switches 547-1 through 547-(*n*–2) to be conductive. In some embodiments, the controller 590 controls the signal at input 549 so as to cause switches 547-1 through 547-(*n*–2) to become conductive after high side transistor 512-*n* becomes conductive. Consequently, at least for reasons similar to those discussed in further detail elsewhere herein, for example, with reference to the operation of power converter stage 100, the voltage at nodes 518-X are equal to (1–X/n) times the voltage at the positive power supply PVIN. In addition, at least for reasons similar to those discussed in further detail elsewhere herein, for example, with reference to the operation of power converter stage 100, the voltages at the gates of high side transistors 512-X are equal to (1–(X–1)/n) times the voltage at the positive power supply PVIN. Therefore, high side transistors 512-1 through 512-*n* are non-conductive.

Power converter stage 500 operates similar to power converter stage 100, as understood by those of skill in the art. For example, the parasitic capacitances at nodes 518-1 through 518-(*n*–1) and 550 are charged and discharged similarly or identically to the charging and discharging of the parasitic capacitances at nodes 118-1, 118-2, and 150, discussed with reference to power converter stage 100 of FIG. 1. Because these capacitances are charged by through inductor 560 and discharged to the load through inductor 560, these capacitances are lossless. In addition, the Vds voltages of high side transistors 512-1 through 512-*n* and the low side transistors 542-1 through 542-*n* remain less than the maximum Vds threshold voltages of high side transistors 512-1 through 512-*n* and the low side transistors 542-1 through 542-*n*, such that high side transistors 512-1 through 512-*n* and the low side transistors 542-1 through 542-*n* do not experience Vds voltage overstress during operation. Furthermore, the Vgs and Vgd voltages of high side transistors 512-1 through 512-*n* and the low side transistors 542-1 through 542-*n* remain less than the maximum Vgs and Vgd threshold voltages of high side transistors 512-1 through 512-*n* and the low side transistors 542-1 through 542-*n*, such that high side transistors 512-1 through 512-*n* and the low side transistors 542-1 through 542-*n* do not experience Vgs or Vgd voltage overstress during operation.

FIG. 6 is a schematic illustration of a power converter stage 600 connected to a load represented by capacitance 565 and resistance 580 through load inductor 560 according to an embodiment. The various signals at inputs 506, 508, 529, and 549 are driven by controller 590 so as to cause power converter stage 600 to provide power to the load.

For example, the controller 590 may be configured to receive an indication of a target voltage for the load and to receive an indication of the actual output voltage at the node 570 at the load. The controller 590 may be further configured to provide signals to the inputs 506, 508, 529, and 549 of power converter stage 600 in response to a difference between the indication of the actual voltage and the indication of the target voltage, as understood by those of skill in the art.

Power converter stage 600 includes high side transistors 512-1, and 512-2 through 512-*n*, inverting circuit 510, capacitors 525-1 through 525-(*n*–2), switches 527-1 through 527-(*n*–2), bias voltage generator 520, low side transistors 542-1, and 542-2 through 542-*n*, inverting circuit 530, capacitors 545-1 through 545-(*n*–2), switches 547-1 through 547-(*n*–2), and bias voltage generator 540.

The high side transistors 512-1 through 512-*n*, inverting circuit 510, capacitors 525-1 through 525-(*n*–2), switches 527-1 through 527-(*n*–2), bias voltage generator 520, low side transistors 542-1 through 542-*n*, inverting circuit 530, capacitors 545-1 through 545-(*n*–2), switches 547-1 through 547-(*n*–2), and bias voltage generator 540 function similarly or identically to that discussed above with the corresponding structures of power converter stage 500, discussed above with reference to FIG. 5.

Power converter stage 600 also includes clamping switches 523-3 through 523-*n* respectively connected to the gates of high side transistors 512-3 through 512-*n*. In the illustrated embodiment, clamping switches 523-3 through 523-(*n*–1) are respectively connected to the sources of high side transistors 512-3 through 512-(*n*–1), and clamping switch 523-*n* is connected to bias voltage at node 542 generated by bias voltage generator 540. In some embodiments, clamping switch 523-*n* is connected to the source of high side transistor 512-*n*.

Because of charge sharing among parasitic capacitors of high side transistors 512-1 through 512-*n*, low side transistor 542-*n*, and capacitors 525-1 through 525-(*n*–2), during high to low transients of the voltage at node 550, the Vds voltages of one or more of the high side transistors 512-1 through 512-*n* may be at risk of becoming greater than the voltage of positive power supply PVIN/n. At least to prevent overstress damage, clamping switches 523-3 through 523-*n* are turned on to improve the Vds voltage division among the high side transistors 512-1 through 512-*n*.

In some embodiments, an additional clamping switch (not shown) is included. In some embodiments, the additional clamping switch is connected between the gate and source of high side transistor 512-2. In addition, the conductivity of the additional clamping switch may be controlled by controller 590 so as to be conductive while the clamping switches 523-3 through 523-*n* are conductive and to be non-conductive while the clamping switches 523-3 through 523-*n* are non-conductive.

In some embodiments, the controller 590 may cause clamping switches 523-3 through 523-*n* to become conductive after the voltage at node 550 becomes the voltage of negative power supply GND and before the signal at input 508 causes low side transistor 542-1 to become conductive. In some embodiments, the controller 590 may cause clamping switches 523-3 through 523-*n* to become conductive in response to the voltage at node 550 becoming the voltage of negative power supply GND. In some embodiments, the controller 590 may cause clamping switches 523-3 through 523-*n* to become conductive in response to a signal at input 508 which causes low side transistor 542-1 to become conductive. In some embodiments, the clamping switches 523-3 through 523-*n* become conductive in response to a signal at input 508 which causes low side transistor 542-1 to become conductive. In some embodiments, the clamping switches 523-3 through 523-*n* become conductive in response to a signal at the gate of low side transistor 542-1 which causes low side transistor 542-1 to become conductive. In some embodiments, the clamping switches 523-3 through 523-*n* become conductive in response to a signal at input 549 which causes switches 547-1 through 547-(*n*−2) to become conductive. In some embodiments, the signal at input 508, or another signal coordinated therewith, may be used to control the conductivity of the clamping switches 523-3 through 523-*n*. In some embodiments, clamping switches 523-3 through 523-*n* are conductive for a duration less than the duration of the high time of the signal at input 508.

Because the clamping switches 523-3 through 523-*n* become conductive the Vds voltage division among the high side transistors 512-1 through 512-*n* is improved, and overvoltage times of the high side transistors 512-1 through 512-*n* are reduced or eliminated.

In some embodiments, the controller 590 may cause clamping switches 523-3 through 523-*n* to become non-conductive before the voltage at node 550 becomes the voltage of positive power supply PVIN and before the signal at input 506 causes high side transistor 512-1 to become conductive. In some embodiments, the controller 590 may cause clamping switches 523-3 through 523-*n* to become non-conductive in response to the voltage at node 550 becoming the voltage of positive power supply PVIN. In some embodiments, the controller 590 may cause clamping switches 523-3 through 523-*n* to become non-conductive in response to a signal at input 506 which causes high side transistor 512-1 to become conductive. In some embodiments, the clamping switches 523-3 through 523-*n* become non-conductive in response to a signal at the gate of high side transistor 512-1 which causes high side transistor 512-1 to become conductive. In some embodiments, the clamping switches 523-3 through 523-*n* become non-conductive in response to a signal at input 529 which causes switches 527-1 through 527-(*n*−2) to become conductive. In some embodiments, the signal at input 506, or another signal coordinated therewith, may be used to control the conductivity of the clamping switches 523-3 through 523-*n*. In some embodiments, clamping switches 523-3 through 523-*n* are conductive for a duration less than the duration of the high time of the signal at input 506.

Power converter stage 600 also includes clamping switches 543-3 through 543-*n* respectively connected to the gates of low side transistors 542-3 through 542-*n*. In the illustrated embodiment, clamping switches 543-3 through 543-(*n*−1) are respectively connected to the sources of low side transistors 542-3 through 542-(*n*−1), and clamping switch 543-*n* is connected to bias voltage at node 522 generated by bias voltage generator 520. In some embodiments, clamping switch 543-*n* is connected to the source of low side transistor 542-*n*.

Because of charge sharing among parasitic capacitors of low side transistors 542-1 through 542-*n*, high side transistor 512-*n*, and capacitors 545-1 through 545-(*n*−2), during low to high transients of the voltage at node 550, the Vds voltages of one or more of the low side transistors 542-1 through 542-*n* may be at risk of becoming greater than the voltage of positive power supply PVIN/n. At least to prevent overstress damage, clamping switches 543-3 through 543-*n* are turned on to improve the Vds voltage division among the low side transistors 542-1 through 542-*n*.

In some embodiments, an additional clamping switch (not shown) is included. In some embodiments, the additional clamping switch is connected between the gate and source of low side transistor 542-2. In addition, the conductivity of the additional clamping switch may be controlled by controller 590 so as to be conductive while the clamping switches 543-3 through 543-*n* are conductive and to be non-conductive while the clamping switches 543-3 through 543-*n* are non-conductive.

In some embodiments, the controller 590 may cause clamping switches 543-3 through 543-*n* to become conductive after the voltage at node 550 becomes the voltage of positive power PVIN and before the signal at input 506 causes high side transistor 512-1 to become conductive. In some embodiments, the controller 590 may cause clamping switches 543-3 through 543-*n* to become conductive in response to the voltage at node 550 becoming the voltage of positive power PVIN. In some embodiments, the controller 590 may cause clamping switches 543-3 through 543-*n* to become conductive in response to a signal at input 506 which causes high side transistor 512-1 to become conductive. In some embodiments, the clamping switches 543-3 through 543-*n* become conductive in response to a signal at input 506 which causes high side transistor 512-1 to become conductive. In some embodiments, the clamping switches 543-3 through 543-*n* become conductive in response to a signal at the gate of high side transistor 512-1 which causes high side transistor 512-1 to become conductive. In some embodiments, the clamping switches 543-3 through 543-*n* become conductive in response to a signal at input 529 which causes switches 527-1 through 527-(*n*−2) to become conductive. In some embodiments, the signal at input 506, or another signal coordinated therewith, may be used to control the conductivity of the clamping switches 543-3 through 543-*n*. In some embodiments, clamping switches 543-3 through 543-*n* are conductive for a duration less than the duration of the high time of the signal at input 506.

Because the clamping switches 543-3 through 543-*n* become conductive the Vds voltage division among the low side transistors 542-1 through 542-n is improved, and overvoltage times of the low side transistors 542-1 through 542-n are reduced or eliminated.

In some embodiments, the controller 590 may cause clamping switches 543-3 through 543-n to become non-conductive before the voltage at node 550 becomes the voltage of negative power supply GND and before the signal at input 508 causes low side transistor 542-1 to become conductive. In some embodiments, the controller 590 may cause clamping switches 543-3 through 543-n to become non-conductive in response to the voltage at node 550 becoming the voltage of negative power supply GND. In some embodiments, the controller 590 may cause clamping switches 543-3 through 543-n to become non-conductive in response to a signal at input 508 which causes low side transistor 542-1 to become conductive. In some embodiments, the clamping switches 543-3 through 543-n become non-conductive in response to a signal at the gate of low side transistor 542-1 which causes low side transistor 542-1 to become conductive. In some embodiments, the clamping switches 543-3 through 543-n become non-conductive in response to a signal at input 549 which causes switches 547-1 through 547-(n−2) to become conductive. In some embodiments, the signal at input 508, or another signal coordinated therewith, may be used to control the conductivity of the clamping switches 543-3 through 543-n. In some embodiments, clamping switches 543-3 through 543-n are non-conductive for a duration greater than the duration of the high time of the signal at input 508.

As used herein, the terms "before," "after," and other time relational terms include the restriction that the time related events are within a single period of a repeated signal.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A power converter comprising:
   a positive power supply terminal;
   a negative power supply terminal;
   an output node;
   first, second, and third high side transistors serially connected between the positive power supply terminal and the output node;
   a high side bias voltage generator configured to generate a high side bias voltage, wherein a gate of the second high side transistor is connected to the high side bias voltage generator;
   a controller configured to selectively connect a gate of the first high side transistor to either the positive power supply terminal or the high side bias voltage generator; and
   a high side switch configured to selectively connect a gate of the third high side transistor to the high side bias voltage generator in response to a high side signal received directly from the controller, wherein the high side signal switches between low and high voltage states.

2. The power converter of claim 1, further comprising:
   first, second, and third low side transistors serially connected between the negative power supply terminal and the output node;
   a low side bias voltage generator configured to generate a low side bias voltage, wherein a gate of the second low side transistor is connected to the low side bias voltage generator,
   wherein the controller is configured to selectively connect a gate of the first low side transistor to either the negative power supply terminal or the low side bias voltage generator;
   a low side switch configured to selectively connect a gate of the third low side transistor to the low side bias voltage generator in response to a low side signal from the controller, wherein the low side signal switches between the low and high voltage states; and
   a low side capacitor connected to the gate of the third low side transistor and to a source of the second low side transistor.

3. The power converter of claim 2, wherein the low side bias voltage generator is configured to generate a voltage equal to ⅓ of the voltage difference between the voltage of the positive power supply terminal and the voltage of the negative power supply terminal.

4. The power converter of claim 2, wherein the first, second, and third low side transistors are configured to become conductive in response to the controller connecting the gate of the first low side transistor to the low side bias voltage generator.

5. The power converter of claim 2, wherein the controller is configured to cause the low side switch to connect the gate of the third low side transistor to the low side bias voltage generator while the gate of the first low side transistor is connected to the low side bias voltage generator.

6. The power converter of claim 2, wherein the controller is configured to cause the low side switch to disconnect the gate of the third low side transistor from the low side bias voltage generator while the gate of the first low side transistor is connected to the negative power supply terminal.

7. The power converter of claim 1, wherein the high side bias voltage generator is configured to generate a voltage equal to ⅔ of the voltage difference between the voltage of the positive power supply terminal and the voltage of the negative power supply terminal.

8. The power converter of claim 1, wherein the first, second, and third high side transistors are configured to become conductive in response to the controller connecting the gate of the first high side transistor to the high side bias voltage generator.

9. The power converter of claim 1, wherein the controller is configured to cause the high side switch to connect the gate of the third high side transistor to the high side bias voltage generator while the gate of the first high side transistor is connected to the high side bias voltage generator.

10. The power converter of claim 1, wherein the controller is configured to cause the high side switch to disconnect the gate of the third high side transistor from the high side bias voltage generator while the gate of the first high side transistor is connected to the positive power supply terminal.

11. A method of operating a power converter comprising a positive power supply, a negative power supply, an output node, first, second, and third high side transistors serially connected between the positive power supply and the output node, a high side bias voltage generator, a controller, and a high side switch, the method comprising:
   with the high side bias voltage generator, providing a high side bias voltage to a gate of the second high side transistor;

with the controller, selectively connecting a gate of the first high side transistor to either the positive power supply or the high side bias voltage generator; and with the high side switch, selectively connecting a gate of the third high side transistor to the high side bias voltage generator in response to a high side signal received directly from the controller, wherein the high side signal switches between low and high voltage states.

12. The method of claim 11, wherein the power converter further comprises first, second, and third low side transistors serially connected between the negative power supply and the output node, a low side bias voltage generator, a low side switch, and a low side capacitor, and wherein the method further comprises:

with the low side bias voltage generator, providing a low side bias voltage to a gate of the second low side transistor;

with the controller, selectively connecting a gate of the first low side transistor to either the negative power supply or the low side bias voltage generator; and with the low side switch, selectively connecting a gate of the third high side transistor to the low side bias voltage generator in response to a low side signal from the controller, wherein the low side signal switches between the low and high voltage states.

13. The method of claim 12, wherein the low side bias voltage generator is configured to generate a voltage equal to ⅓ of the voltage difference between the voltage of the positive power supply and the voltage of the negative power supply.

14. The method of claim 12, wherein the first, second, and third low side transistors are configured to become conductive in response to the controller connecting the gate of the first low side transistor to the low side bias voltage generator.

15. The method of claim 12, further comprising, with the controller, causing the low side switch to connect the gate of the third low side transistor to the low side bias voltage generator while the gate of the first low side transistor is connected to the low side bias voltage generator.

16. The method of claim 12, further comprising, with the controller, causing the low side switch to disconnect the gate of the third low side transistor from the low side bias voltage generator while the gate of the first low side transistor is connected to the negative power supply.

17. The method of claim 11, wherein the high side bias voltage generator is configured to generate a voltage equal to ⅔ of the voltage difference between the voltage of the positive power supply and the voltage of the negative power supply.

18. The method of claim 11, wherein the first, second, and third high side transistors are configured to become conductive in response to the controller connecting the gate of the first high side transistor to the high side bias voltage generator.

19. The method of claim 11, further comprising, with the controller, causing the high side switch to connect the gate of the third high side transistor to the high side bias voltage generator while the gate of the first high side transistor is connected to the high side bias voltage generator.

20. The method of claim 11, further comprising, with the controller, causing the high side switch to disconnect the gate of the third high side transistor from the high side bias voltage generator while the gate of the first high side transistor is connected to the positive power supply.

* * * * *